(12) United States Patent
Porterfield

(10) Patent No.: US 6,379,412 B1
(45) Date of Patent: Apr. 30, 2002

(54) AIR FILTERING ASSEMBLY

(76) Inventor: Albert Porterfield, 3842 Strathmore Dr., Montgomery, AL (US) 36116

( * ) Notice: Subject to any disclaimer, the term of this patent is extended or adjusted under 35 U.S.C. 154(b) by 4 days.

(21) Appl. No.: 09/621,981

(22) Filed: Jul. 21, 2000

(51) Int. Cl.[7] .............................................. B01D 35/30
(52) U.S. Cl. ........................... 55/493; 55/501; 55/504; 55/DIG. 35; 55/DIG. 37
(58) Field of Search ...................... 55/493, 495, 501, 55/504, 503, DIG. 35, DIG. 37; 454/289, 290, 330, 331

(56) References Cited

U.S. PATENT DOCUMENTS

| | | |
|---|---|---|
| D118,420 S | 1/1940 | Sinclair |
| 3,905,787 A | 9/1975 | Roth |
| D344,581 S | 2/1994 | Kenneth |
| D344,792 S | 3/1994 | Sofia |
| 5,665,145 A | 9/1997 | Goodman et al. |
| 5,690,719 A * | 11/1997 | Hodge ............................ 96/17 |
| 5,766,285 A * | 6/1998 | Killman ..................... 55/385.6 |
| 5,840,245 A | 11/1998 | Coombs et al. |
| 5,863,310 A * | 1/1999 | Brown et la. .................. 55/480 |
| 6,234,893 B1 * | 5/2001 | Meredith ..................... 454/289 |

* cited by examiner

Primary Examiner—Robert A. Hopkins

(57) ABSTRACT

A air filtering assembly for removing particulate matter from air supplied through HVAC ducts. The air filtering assembly includes a frame assembly including a connection assembly adapted for coupling to an air vent, and an air filter couplable to the frame assembly and positioned adjacent to the air vent for filtering the air directed through the air vent.

10 Claims, 2 Drawing Sheets

AIR FILTERING ASSEMBLY

BACKGROUND OF THE INVENTION

1. Field of the Invention

The present invention relates to air filtration devices and more particularly pertains to a new air filtering assembly for removing particulate matter from air supplied through HVAC ducts.

2. Description of the Prior Art

The use of air filtration devices is known in the prior art. More specifically, air filtration devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,665,145; 5,840,245; U.S. Pat. No. Des. 344,581; U.S. Pat. No. 3,905,787; U.S. Pat. No. Des. 118,420; and U.S. Pat. No. Des. 344,792.

While these devices fulfill their respective, particular objectives and requirements, the aforementioned patents do not disclose a new air filtering assembly. The inventive device includes a frame assembly including a connection assembly adapted for coupling to an air vent, and an air filter couplable to the frame assembly and positioned adjacent to the air vent for filtering the air directed through the air vent.

In these respects, the air filtering assembly according to the present invention substantially departs from the conventional concepts and designs of the prior art, and in so doing provides an apparatus primarily developed for the purpose of removing particulate matter from air supplied through HVAC ducts.

SUMMARY OF THE INVENTION

In view of the foregoing disadvantages inherent in the known types of air filtration devices now present in the prior art, the present invention provides a new air filtering assembly construction wherein the same can be utilized for removing particulate matter from air supplied through HVAC ducts.

The general purpose of the present invention, which will be described subsequently in greater detail, is to provide a new air filtering assembly apparatus and method which has many of the advantages of the air filtration devices mentioned heretofore and many novel features that result in a new air filtering assembly which is not anticipated, rendered obvious, suggested, or even implied by any of the prior art air filtration devices, either alone or in any combination thereof.

To attain this, the present invention generally comprises a frame assembly including a connection assembly adapted for coupling to an air vent, and an air filter couplable to the frame assembly and positioned adjacent to the air vent for filtering the air directed through the air vent.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air filtering assembly apparatus and method which has many of the advantages of the air filtration devices mentioned heretofore and many novel features that result in a new air filtering assembly which is not anticipated, rendered obvious, suggested, or even implied by any of the prior art air filtration devices, either alone or in any combination thereof.

It is another object of the present invention to provide a new air filtering assembly which may be easily and efficiently manufactured and marketed.

It is a further object of the present invention to provide a new air filtering assembly which is of a durable and reliable construction.

An even further object of the present invention is to provide a new air filtering assembly which is susceptible of a low cost of manufacture with regard to both materials and labor, and which accordingly is then susceptible of low prices of sale to the consuming public, thereby making such air filtering assembly economically available to the buying public.

Still yet another object of the present invention is to provide a new air filtering assembly which provides in the apparatuses and methods of the prior art some of the advantages thereof, while simultaneously overcoming some of the disadvantages normally associated therewith.

Still another object of the present invention is to provide a new air filtering assembly for removing particulate matter from air supplied through HVAC ducts.

Yet another object of the present invention is to provide a new air filtering assembly which includes a frame assembly including a connection assembly adapted for coupling to an air vent, and an air filter couplable to the frame assembly and positioned adjacent to the air vent for filtering the air directed through the air vent.

Still yet another object of the present invention is to provide a new air filtering assembly that prevents discomfort for allergy sufferers.

Even still another object of the present invention is to provide a new air filtering assembly that can be retrofit into existing air vents.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
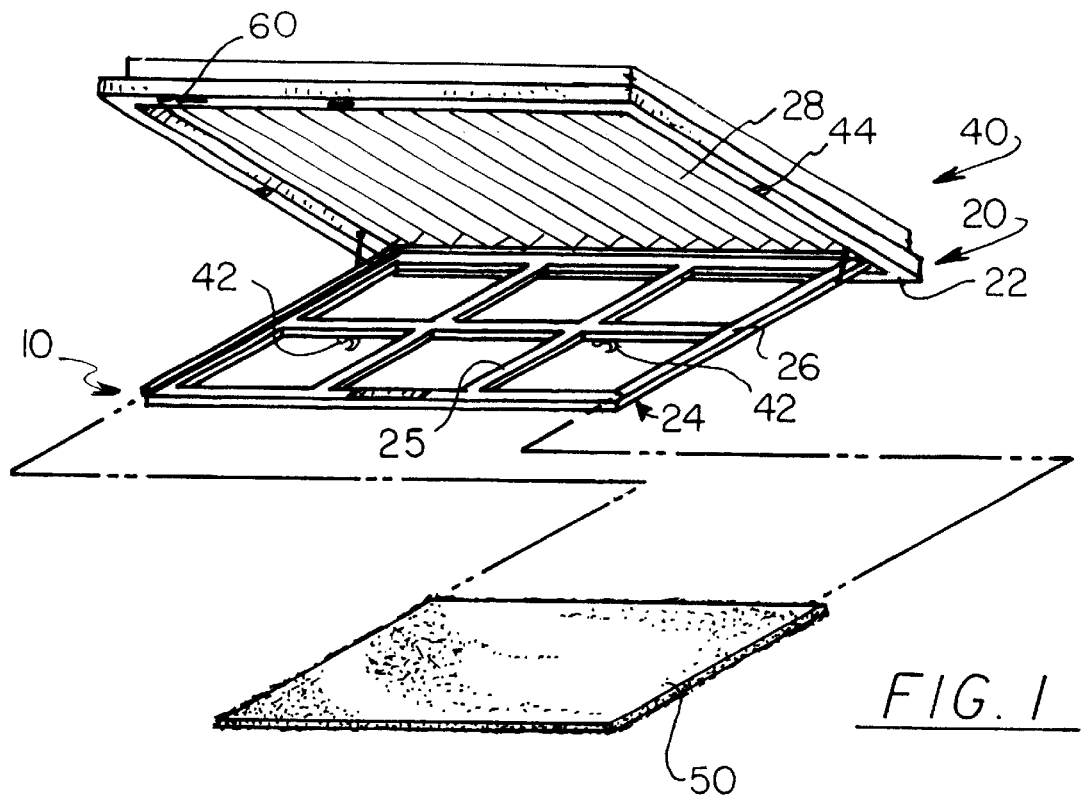
FIG. 1 is a schematic perspective view of a new air filtering assembly according to the present invention.
Figure 2:
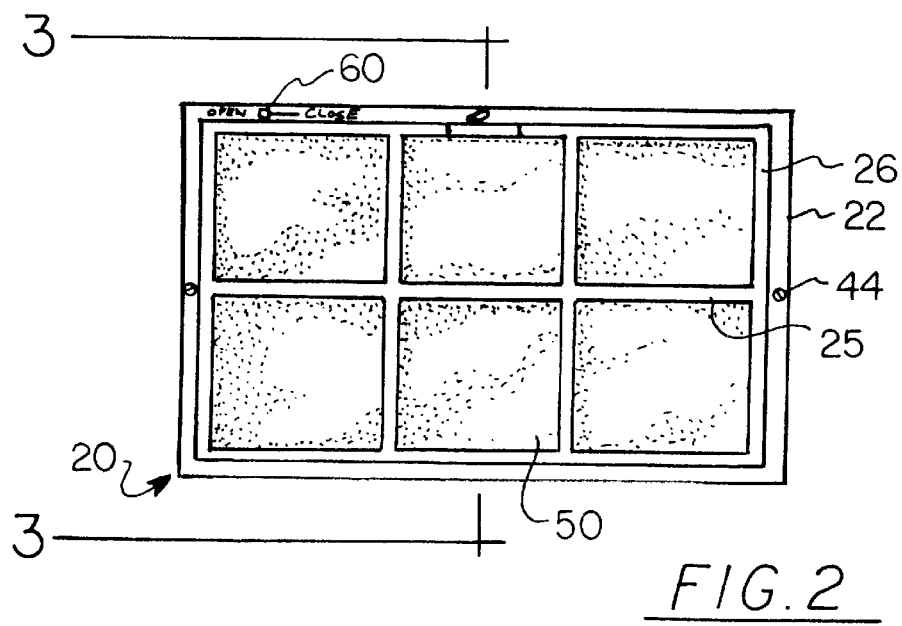
FIG. 2 is a schematic front view of the present invention.
Figure 3:
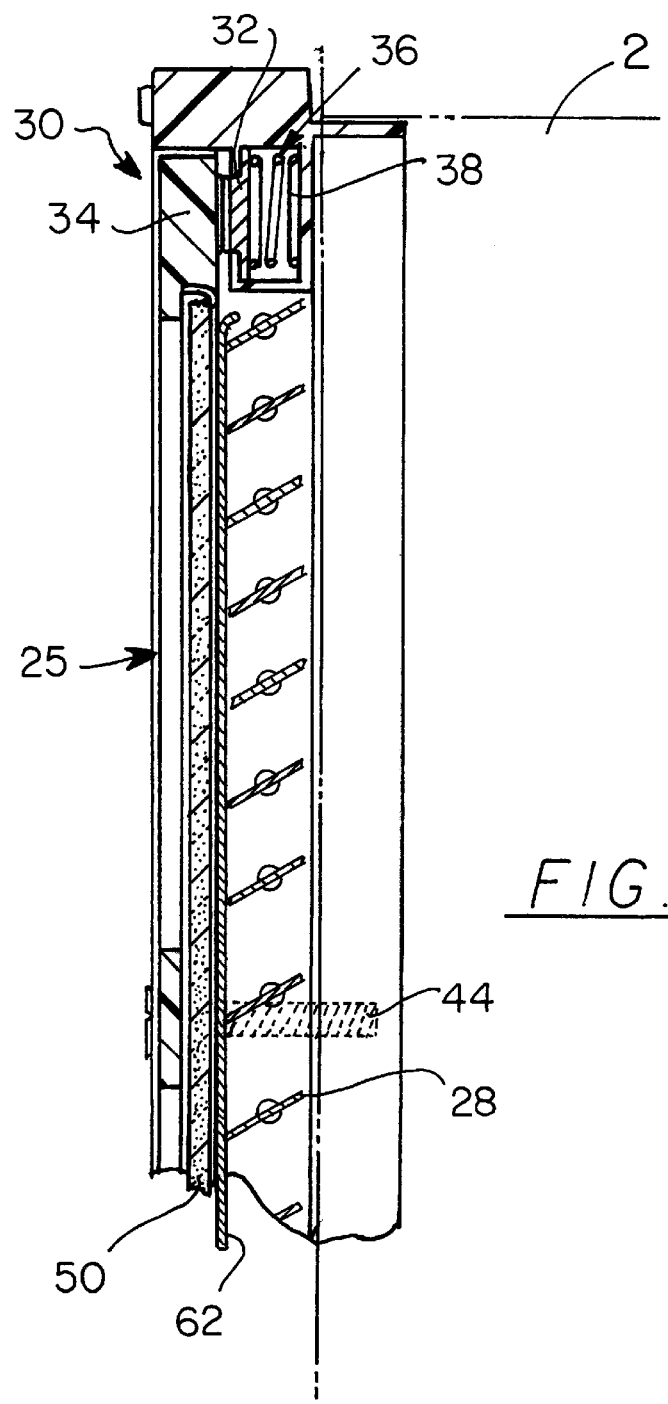
FIG. 3 is a schematic cross-sectional view of the present invention taken along line 3—3 of FIG. 2.
Figure 4:
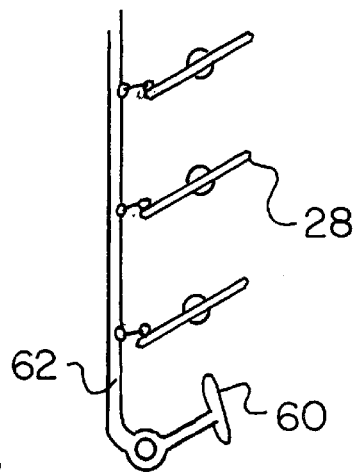
FIG. 4 is a schematic detail view of the louver closing mechanism of the present invention.

With reference now to the drawings, and in particular to FIGS. 1 through 4 thereof, a new air filtering assembly embodying the principles and concepts of the present invention and generally designated by the reference numeral 10 will be described.

As best illustrated in FIGS. 1 through 4, the air filtering assembly 10 generally comprises a frame assembly 20 and an air filter 50.

The frame assembly 20 includes a connection assembly 40 designed for coupling to an air vent 2.

The air filter 50 is couplable to the frame assembly 20 such that the air filter 50 is positioned adjacent to the air vent 2. Thus air passing through the air vent 2 is directed through the air filter 50.

The frame assembly 20 includes a main member 22 and a door 24 pivotally coupled to the main member 22.

A plurality of support members 25 extends between opposite sides of a rim portion 26 of the door 24.

The air filter 50 is positionable in the main member 22 when the door 24 is in an open position. The door 24 is closable for enclosing the air filter 50 in the main member 22.

The connection assembly 40 comprising a plurality of hooks 42 coupled to the frame member 20. Each of the hooks 42 is designed for engaging a screen covering the air vent 2 for holding the frame assembly 20 adjacent to the air vent 2.

The connection assembly 40 comprises a plurality of connecting screws 44. Each of the connecting screws 44 is insertable through an associated connection hole in the frame assembly 20. A distal end of each the connecting screw 44 is threaded such that the distal end is designed for engaging to a threaded connection aperture of the air vent 2 such that the frame assembly 20 is held in position adjacent to the air vent 2.

A plurality of louvers 28 is coupled to the frame assembly 20 such that the louvers 28 are positioned adjacent to the air filter 50 when the air filter 50 is coupled to the frame assembly 20.

Each of the louvers 28 includes a planar portion. Each of the louvers 28 is rotatable around a central longitudinal axis of the louver 28 such that the louvers 28 are rotatable between an open position and a closed position. The closed position is defined by the planar portion of each the louver 28 being positioned to contact the planar portion of an adjacently positioned louver 28. Thus air from the air vent 2 is prevented from passing through the air filter 50. The open position is defined by the louvers 28 being rotated such that an associated gap is formed between adjacent pairs of the louvers 28. Thus air from the air vent 2 is permitted to pass through the air filter 50.

A locking assembly 30 is coupled to the frame assembly 20 for holding the door 24 in a closed position. The locking assembly 30 includes a magnet 32 coupled to the door 24 proximate a distal edge of the door 24. The locking assembly 30 further includes a metal latch plate 34 coupled to the main member 22. The metal latch plate 34 is positioned for magnetically engaging the magnet 32 when the door 24 is in the closed position.

The main member 22 includes a biasing chamber 36, which has an opening facing the magnet 32 when the door 24 is in the closed position. The magnet 32 is positioned in the biasing chamber 36 such that an extension portion of the magnet 32 extends through the opening in the biasing chamber 36.

A biasing member 38 is positioned in the biasing chamber 36 for biasing the extension portion of the magnet 32 through the opening in the biasing chamber 36.

The metal latch plate 34 includes a perimeter edge for abutting a lip of the opening of the biasing chamber 36 for preventing the metal latch plate 34 from passing through the opening in the biasing chamber 36.

A handle 60 is coupled to the frame assembly 20 such that a distal end of the handle 60 extends through a slot in the main member 22 of the frame assembly 20. The handle 60 is movable between a first position and a second position. A proximal end of the handle 60 is operationally coupled to the louvers 28 by a connecting rod 62 for rotating the louvers 28 between the open position and the closed position when the handle 60 is moved between the first position and the second position.

In use, the door on the frame assembly is moved to the open position. The air filter is then placed on the main member and captured when the door is returned to the closed position. The door is held closed by the magnetic engagement of the magnet to the latch plate. The frame assembly is then connected to the air vent by use of either of the hooks, the connecting screws, or both. The louvers are then opened allowing air to flow through the filter from the air vent by moving the handle from the closed position to the open position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air filtering assembly comprising:

a frame assembly, said frame assembly including a connection assembly adapted for coupling to an air vent;

an air filter couplable to said frame assembly such that said air filter is positioned adjacent to the air vent whereby air passing through the air vent is directed through said air filter; and said connection assembly comprising a plurality of hooks coupled to said frame assembly, each of said hooks being adapted for engaging a screen covering the air vent for holding said frame assembly adjacent to the air vent.

2. The air filtering assembly of claim 1, further comprising:

said frame assembly including a main member and a door pivotally coupled to said main member;

a plurality of support members extending between opposite sides of a rim portion of said door;

said air filter being positionable in said main member when said door is in an open position, said door being closable for enclosing said air filter in said main member.

3. The air filtering assembly of claim 1, further comprising:

said connection assembly comprising a plurality of connecting screws, each of said connecting screws being insertable through an associated connection hole in said frame assembly, a distal end of each said connecting screw being threaded such that said distal end is adapted for engaging to a threaded connection aperture of the air vent such that said frame assembly is held in position adjacent to the air vent.

4. The air filtering assembly of claim 1, further comprising:

a plurality of louvers coupled to said frame assembly such that said louvers are positioned adjacent to said air filter when said air filter is coupled to said frame assembly.

5. The air filtering assembly of claim 4, further comprising:

each of said louvers having a planar portion, each of said louvers being rotatable around a central longitudinal axis of said louver such that said louvers are rotatable between an open position and a closed position, said closed position being defined by said planar portion of each said louver being positioned to contact said planar portion of an adjacently positioned louver whereby air from the air vent is prevented from passing through said air filter, said open position being defined by said louvers being rotated such that an associated gap is formed between adjacent pairs of said louvers whereby air from the air vent is permitted to pass through said air filter.

6. The air filtering assembly of claim 5, further comprising:

a handle coupled to said frame assembly such that a distal end of said handle extends through a slot in said main member of said frame assembly, said handle being movable between a first position and a second position, a proximal end of said handle being operationally coupled to said louvers for rotating said louvers between said open position and said closed position when said handle is moved between said first position and said second position.

7. The air filtering assembly of claim 2, further comprising:

a locking assembly coupled to said frame assembly for holding said door in a closed position.

8. An air filtering assembly comprising:

a frame assembly, said frame assembly including a connection assembly adapted for coupling to an air vent;

an air filter couplable to said frame assembly such that said air filter is positioned adjacent to the air vent whereby air passing through the air vent is directed through said air filter;

said frame assembly including a main member and a door pivotally coupled to said main member;

a plurality of support members extending between opposite sides of a rim portion of said door;

said air filter being positionable in said main member when said door is in an open position, said door being closable for enclosing said air filter in said main member;

a locking assembly coupled to said frame assembly for holding said door in a closed position;

said locking assembly including a magnet coupled to said door proximate a distal edge of said door; and said locking assembly further including a metal latch plate coupled to said main member, said metal latch plate being positioned for magnetically engaging said magnet when said door is in said closed position.

9. The air filtering assembly of claim 8, further comprising:

said main member including a biasing chamber having an opening facing said magnet when said door is in said closed position, said magnet being positioned in said biasing chamber such that an extension portion of said magnet extends through said opening in said biasing chamber;

a biasing member being positioned in said biasing chamber for biasing said extension portion of said magnet through said opening in said biasing chamber;

said metal latch plate including a perimeter edge for abutting a lip of said opening of said biasing chamber for preventing said metal latch plate from passing through said opening in said biasing chamber.

10. An air filtering assembly comprising:

a frame assembly, said frame assembly including a connection assembly adapted for coupling to an air vent;

an air filter couplable to said frame assembly such that said air filter is positioned adjacent to the air vent whereby air passing through the air vent is directed through said air filter;

said frame assembly including a main member and a door pivotally coupled to said main member;

a plurality of support members extending between opposite sides of a rim portion of said door;

said air filter being positionable in said main member when said door is in an open position, said door being closable for enclosing said air filter in said main member;

said connection assembly comprising a plurality of hooks coupled to said frame member, each of said hooks being adapted for engaging a screen covering the air vent for holding said frame assembly adjacent to the air vent;

said connection assembly comprising a plurality of connecting screws, each of said connecting screws being insertable through an associated connection hole in said frame assembly, a distal end of each said connecting screw being threaded such that said distal end is adapted for engaging to a threaded connection aperture of the air vent such that said frame assembly is held in position adjacent to the air vent;

a plurality of louvers coupled to said frame assembly such that said louvers are positioned adjacent to said air filter when said air filter is coupled to said frame assembly;

each of said louvers having a planar portion, each of said louvers being rotatable around a central longitudinal axis of said louver such that said louvers are rotatable between an open position and a closed position, said closed position being defined by said planar portion of each said louver being positioned to contact said planar portion of an adjacently positioned louver whereby air from the air vent is prevented from passing through said air filter, said open position being defined by said louvers being rotated such that an associated gap is formed between adjacent pairs of said louvers whereby air from the air vent is permitted to pass through said air filter;

a locking assembly coupled to said frame assembly for holding said door in a closed position;

said locking assembly including a magnet coupled to said door proximate a distal edge of said door; and said locking assembly further including a metal latch plate coupled to said main member, said metal latch plate being positioned for magnetically engaging said magnet when said door is in said closed position;

said main member including a biasing chamber having an opening facing said magnet when said door is in said closed position, said magnet being positioned in said biasing chamber such that an extension portion of said magnet extends through said opening in said biasing chamber;

a biasing member being positioned in said biasing chamber for biasing said extension portion of said magnet through said opening in said biasing chamber;

said metal latch plate including a perimeter edge for abutting a lip of said opening of said biasing chamber for preventing said metal latch plate from passing through said opening in said biasing chamber;

a handle coupled to said frame assembly such that a distal end of said handle extends through a slot in said main member of said frame assembly, said handle being movable between a first position and a second position, a proximal end of said handle being operationally coupled to said louvers for rotating said louvers between said open position and said closed position when said handle is moved between said first position and said second position.

* * * * *